United States Patent
Chang et al.

(10) Patent No.: US 11,909,656 B1
(45) Date of Patent: Feb. 20, 2024

(54) IN-NETWORK DECISION FOR END-SERVER-BASED NETWORK FUNCTION ACCELERATION

(71) Applicant: Nokia Solutions and Networks Oy, Espoo (FI)

(72) Inventors: Hyunseok Chang, Holmdel, NJ (US); Sarit Mukherjee, Morganville, NJ (US); Limin Wang, Plainsboro, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/155,416

(22) Filed: Jan. 17, 2023

(51) Int. Cl.
  *G06F 15/16* (2006.01)
  *H04L 47/2483* (2022.01)
  *H04L 47/11* (2022.01)
  *H04L 41/0895* (2022.01)

(52) U.S. Cl.
  CPC ...... *H04L 47/2483* (2013.01); *H04L 41/0895* (2022.05); *H04L 47/11* (2013.01)

(58) Field of Classification Search
  CPC ... H04L 47/2483; H04L 41/0895; H04L 47/11
  See application file for complete search history.

(56) References Cited

U.S. PATENT DOCUMENTS

| | | | |
|---|---|---|---|
| 6,047,357 A | 4/2000 | Bannon et al. | |
| 7,289,442 B1 | 10/2007 | Srinivasan et al. | |
| 8,931,088 B2 | 1/2015 | Chen et al. | |
| 8,937,865 B1 | 1/2015 | Kumar et al. | |
| 9,092,269 B2 * | 7/2015 | Kandula | G06F 9/45533 |
| 9,160,650 B2 | 10/2015 | Zhang et al. | |
| 9,185,015 B2 | 11/2015 | Matthews | |
| 9,379,973 B2 | 6/2016 | Mekkattuparamban et al. | |
| 9,477,604 B2 | 10/2016 | Banavalikar et al. | |
| 9,686,200 B2 | 6/2017 | Pettit et al. | |
| 9,762,492 B2 | 9/2017 | Szabo et al. | |
| 9,998,352 B2 | 6/2018 | Liang et al. | |

(Continued)

OTHER PUBLICATIONS

Estan, Cristian et al. "New Directions in Traffic Measurement and Accounting" SIGCOMM Computer Communication Review (Oct. 2002): 323-336.

(Continued)

*Primary Examiner* — Hieu T Hoang
(74) *Attorney, Agent, or Firm* — Mendelsohn Dunleavy, P.C.; Steve Mendelsohn

(57) ABSTRACT

A CPU implements a virtual network function (VNF) associated with flow processing and can offload at least some of the flow processing to a hardware accelerator. A module (e.g., TOR switch), external to the software-based processor and the hardware accelerator, examines packet flows and determines (e.g., using a top-K elephant-flow-detection algorithm) which ones are more suitable for offloading from the software-based processor to the hardware accelerator than others. The external module communicates the relative suitability for offloading to the CPU using packet tags or out-of-band messaging, and the CPU uses the relative suitability to determine which flows to offload or onload. In some implementations, the CPU can instruct the external module to change the value of K used in the algorithm.

32 Claims, 10 Drawing Sheets

(56) References Cited

U.S. PATENT DOCUMENTS

| | | | |
|---|---|---|---|
| 10,110,517 B2 | 10/2018 | Yu et al. | |
| 10,353,722 B2* | 7/2019 | Karino | G06F 9/45558 |
| 10,541,918 B2 | 1/2020 | Singh et al. | |
| 10,997,106 B1* | 5/2021 | Bandaru | G06F 13/385 |
| 11,115,385 B1* | 9/2021 | Patel | H04L 63/1408 |
| 11,258,707 B1* | 2/2022 | Pudiyapura | H04L 47/2441 |
| 2011/0320632 A1* | 12/2011 | Karino | H04L 45/38 709/238 |
| 2013/0318255 A1* | 11/2013 | Karino | H04L 45/00 709/238 |
| 2014/0215465 A1* | 7/2014 | Elzur | H04L 41/0893 718/1 |
| 2014/0226661 A1 | 8/2014 | Mekkattuparamban et al. | |
| 2016/0094667 A1* | 3/2016 | Jani | G06F 9/4411 709/202 |
| 2016/0105364 A1* | 4/2016 | Kanonakis | H04L 47/10 370/235 |
| 2016/0232019 A1* | 8/2016 | Shah | G06F 9/45558 |
| 2016/0285771 A1* | 9/2016 | Kulkarni | H04L 47/2483 |
| 2017/0019331 A1* | 1/2017 | Yong | H04L 45/22 |
| 2017/0094377 A1* | 3/2017 | Herdrich | H04Q 9/02 |
| 2017/0177396 A1* | 6/2017 | Palermo | G06F 9/45558 |
| 2017/0212864 A1 | 7/2017 | Leitner | |
| 2017/0366605 A1* | 12/2017 | Chang | H04L 67/1008 |
| 2018/0109471 A1* | 4/2018 | Chang | H04L 49/70 |
| 2018/0109606 A1* | 4/2018 | Alpert | H04L 45/16 |
| 2018/0359131 A1* | 12/2018 | Cheng | H04L 41/5061 |
| 2019/0081904 A1* | 3/2019 | Bohrer | H04L 47/20 |
| 2019/0163630 A1 | 5/2019 | Gray et al. | |
| 2019/0260676 A1 | 8/2019 | Singh et al. | |
| 2020/0076928 A1 | 3/2020 | Wang et al. | |
| 2020/0099628 A1* | 3/2020 | Parikh | H04L 47/6255 |
| 2020/0110626 A1* | 4/2020 | Kochevar-Cureton | H04L 12/4645 |
| 2020/0195558 A1* | 6/2020 | Schultz | H04L 45/7453 |
| 2020/0326885 A1 | 10/2020 | Wozniak et al. | |
| 2020/0334065 A1* | 10/2020 | Wang | H04L 43/0817 |
| 2021/0117360 A1* | 4/2021 | Kutch | G06F 13/4027 |
| 2021/0124694 A1 | 4/2021 | Verplanken | |
| 2021/0157621 A1* | 5/2021 | Galles | H04L 43/16 |
| 2021/0157725 A1 | 5/2021 | Barbalho et al. | |
| 2021/0160184 A1 | 5/2021 | Katan et al. | |
| 2021/0194828 A1* | 6/2021 | He | H04L 47/13 |
| 2021/0314232 A1* | 10/2021 | Nainar | H04L 45/02 |
| 2021/0349820 A1* | 11/2021 | Kutch | G06F 12/0802 |
| 2021/0377188 A1* | 12/2021 | Ghag | H04L 47/125 |
| 2021/0390004 A1* | 12/2021 | Kundu | G06F 9/545 |
| 2022/0006737 A1 | 1/2022 | Chang et al. | |
| 2022/0353240 A1* | 11/2022 | McDowall | H04L 63/02 |
| 2022/0353339 A1* | 11/2022 | Singh | H04L 47/35 |
| 2022/0385631 A1* | 12/2022 | McDowall | H04L 63/1433 |
| 2022/0393974 A1* | 12/2022 | Wen | H04L 45/54 |

OTHER PUBLICATIONS

Estan, Cristian et al. "New Directions in Traffic Measurement and Accounting: Focusing on the Elephants, Ignoring the Mice." ACM Transactions on Computer Systems 21.3 (2003): 270-313.

Cache replacement policies, www.wikipedia.org, 2004 [retrieved on May 26, 2020] Retrieved from the Internet: <URL: https://en.wikipedia.org/w/index.php?title=Cache_replacement_policies&oldid=956106778> (9 pages).

Hao, Fang et al., "Fast, Memory Efficient Flow Rate Estimation Using Runs" IEEE/ACM Tranactions on Networking 15.6 (Dec. 2007): 1467-1477.

Gong, Junzhi et al., "HeavyKeeper: An Accurate Algorithm for Finding Top-k Elephant Flows." Proceedings of the 2018 USENIX Annual Technical Conference, Boston, MA (Jul. 2018): 909-921.

Sivaraman, Vibhaalakshmi et al. "Heavy-Hitter Detection Entirely in the Data Plane" Proceedings of the Symposium on SDN Research, SOSR 2017, Association for Computing Machinery, Inc, (2017): 164-176.

OvS-DPDK Datapath Classifier, www.intel.com, 2016 [retrieved on May 29, 2020] Retrieved from the Internet: <URL: https://software.intel.com/content/www/us/en/develop/articles/ovs-dpdk-datapath-classifier.html> (13 pages).

OvS-DPDK Datapath Classifier—Part 2, www.intel.com, 2016 [retrieved on May 29, 2020] Retrieved from the Internet: <URL: https://software.intel.com/content/www/us/en/develop/articles/ovs-dpdk-datapath-classifier-part-2.html> (19 pages).

Katsikas, Georgios P., et al. "What You Need to Know About (Smart) Network Interface Cards." Passive and Active Measurement: 22nd International Conference (PAM 2021), Virtual Event, Mar. 29-Apr. 1, 2021 (2021): 319-336.

Macdavid, Robert, et al. "A P4-based 5G User Plane Function." Proceedings of the ACM SIGCOMM Symposium on SDN Research (SOSR). Virtual event, Sep. 20-21, 2021: 162-168.

Shah, Hemal V., et al. "OvS Offload—Dynamic Rebalancing." Open vSwitch and OVN 2021 Fall Conference, Virtual Event, Dec. 7-8, 2021: 5 pages.

Tseng, Janet, et al. "Accelerating Open vSwitch with Integrated GPU." Proceedings of the Workshop on Kernel-Bypass Networks (KBNets '17). Aug. 21, 2017, Los Angeles, CA, USA. (2017): 7-12.

Wang, Yanshu, et al. "Elixir: A High-performance and Low-cost Approach to Managing Hardware/Software Hybrid Flow Tables Considering Flow Burstiness." 19th USENIX Symposium on Networked Systems Design and Implementation (NSDI 22). (2022): 535-550.

Zhou, Cong, et al. "A 100Gbps User Plane Function Prototype Based on Programmable Switch for 5G Network." 6th Asia-Pacific Workshop on Networking (APNet '22), Jul. 1-2, Fuzhou, China (2022): 1-2.

\* cited by examiner

FIG. 7

```
Algorithm 1: Top-K elephant flow detection.
Input:
• Packet p                                    // input packet
• flowcache[0 : K]                            // array of top-K flows
• SC[0 : K]            // array of sticky counters for top-K flows
Output: Packet p with an optional tag attached
f_p ← flow(p)                         // extract flow properties from p
i ← hash(f_p) % K                              // cache position
f_c ← flowcache[i]                     // an existing cached flow
if f_p = f_c then
    /* cache hit at cache line i */
    SC[i] ← SC[i] + D
    if SC[i] > SC_max then
        /* f_p is added to top-K set */
        Add a tag <add f_p> to p if f_p was not tagged before
    end
else
    /* cache miss at cache line i */
    SC[i] ← SC[i] - 1
    if SC[i] ≤ 0 then
        flowcache[i] ← f_p
        SC[i] ← C
        /* f_c is removed from top-K set */
        Add a tag <remove f_c> to p
    end
end
```

FIG. 8

Algorithm 2: Top-$K$ elephant flow detection during hash resizing from $K$ to $K'$ ($K'$ can be smaller or larger than $K$).

Input:
- Packet $p$     // input packet
- $flowcache[0:K]$     // array of top-$K$ flows
- $SC[0:K]$     // array of sticky counters for top-$K$ flows
- $flowcache'[0:K']$     // array of top-$K'$ flows
- $SC'[0:K']$     // array of sticky counters for top-$K'$ flows
- $done[0:K]$     // migration status of top-$K$ flows
- $M_f$     // number of migrated top-$K$ flows
- $S_{tag}$     // set of pending tags

Output: Packet $p$ with an optional tag attached $f_p \leftarrow flow(p)$     // extract flow properties from $p$
$i \leftarrow hash(f_p) \ \% \ K$     // old cache position
if $done[i]$ is not true then
    /* incremental migration flows from top-$K$ to top-$K'$ starting from $i$ */
    /* as a side effect, $S_{tag}$ can be updated */
    $N \leftarrow$ migrate-flows ($i$, $flowcache$, $SC$, $flowcache'$, $SC'$, $done$, $S_{tag}$)
    $M_f \leftarrow M_f + N$
    if $M_f = \#flows$ in $flowcache[0:K]$ then
        destroy($flowcache[0:K]$)
        activate Algorithm 1 for subsequent packets
    end
end

```
i' ← hash(f_p) % K'                  // new cache position
f_c' ← flowcache' [i']               // new cached flow
if f_p = f_c' then
    /* cache hit at cache line i */
    SC' [i'] ← SC' [i'] + D
    if SC' [i'] > SC_max then
        /* f_p is added to top-K' set */
        Add a tag <add f_p> to p if f_p was not tagged before
        Add any pending tag(s) stored in S_tag to p
        Remove added tags from S_tag
    end
else
    /* cache miss at cache line i */
    SC' [i'] ← SC' [i'] - 1
    if SC' [i'] ≤ 0 then
        flowcache[i'] ← f_p
        SC' [i'] ← C
        /* f_c' is removed from top-K' set */
        Add a tag <remove f_c'> to p
        Add any pending tag(s) stored in S_tag to p
        Remove added tags from S_tag
    end
end
```

| Algorithm 3: migrate-flow(): it migrates up to $M_{const}$ flows from top-$K$ flow cache to top-$K'$ flow cache. |
|---|

Input:
- $pos$                                                   // starting migration position
- $flowcache[0:K]$            // array of top-$K$ flows
- $SC[0:K]$     // array of sticky counters for top-$K'$ flows
- $flowcache'[0:K']$        // array of top-$K'$ flows
- $SC'[0:K']$   // array of sticky counters for top-$K'$ flows
- $done[0:K]$        // migration status of top-$K$ flows
- $S_{tag}$                                      // set of pending tags

Output: Number of migrated flows $N \leftarrow 0$
for $i = pos$ to $pos + M_{const} - 1$ do
    $k \leftarrow i \% K$
    if $done[k]$ is not true then
        $j \leftarrow hash(flowcache[k]) \% K'$
        // Migrate flow from $k$ in top-$K$ to $j$ in top-$K'$
        if $SC'[j] < SC[k]$ then
            if $SC'[j] > SC_{max}$ then
                add <remove $flowcache'[j]$> to $S_{tag}$
            end
            $SC'[j] \leftarrow SC[k]$
            $flowcache'[j] \leftarrow flowcache[k]$
        else
            if $SC[k] > SC_{max}$ then
                add <remove $flowcache[k]$> to $S_{tag}$
            end
        end
        $done[k] \leftarrow true$
        $N \leftarrow N + 1$
    end
end
return $N$

*FIG. 10*

| MATCH | ACTION | # ELEPHANT FLOWS ($C_E$) | OFFLOAD |
|---|---|---|---|
| srcIP=1.1.1.0/24 | FWD | 1 | NO |
| srcIP=2.2.2.0/24 | DROP | 0 | NO |
| srcIP=3.3.3.0/24 | FWD | 3 | YES |
| ⋮ | ⋮ | ⋮ | ⋮ |

IN-NETWORK DECISION FOR END-SERVER-BASED NETWORK FUNCTION ACCELERATION

BACKGROUND

Field of the Disclosure

The present disclosure relates to network infrastructure and, more specifically but not exclusively, to the employment of hardware offloading from virtual network functions (VNFs) in network infrastructure.

Description of the Related Art

This section introduces aspects that may help facilitate a better understanding of the disclosure. Accordingly, the statements of this section are to be read in this light and are not to be understood as admissions about what is prior art or what is not prior art.

Virtual network functions (VNFs), i.e., softwarized network functions running on commodity hardware, are a critical component of today's data center networking infrastructure. To meet increasingly stringent performance and scalability demands of VNF packet processing, commodity end-servers (where VNFs are deployed) are equipped with programmable hardware acceleration for VNFs, typically their flow-level packet processing, implemented with the embedded hardware switch inside commodity network interface cards (NICs). Hardware acceleration for flow-level packet processing relies on a built-in flow table that stores per-flow match/action tuples inside ternary content-addressable memory (TCAM) for fast flow processing. Therefore, the size of the flow table (i.e., maximum number of entries in the table) places an upper limit on flow-level acceleration.

To allow VNFs to leverage hardware accelerators for flow-level packet processing offload ("flow offload" for short), hardware vendors design their accelerators to be programmable via existing flow-processing APIs, upon which VNFs are commonly implemented. With hardware vendor support, these APIs enable transparent and opportunistic flow offloading to an underlying accelerator. In other words, once a VNF is developed with these APIs, the VNF's flow processing is offloaded to an accelerator only when it is offloadable (e.g., when given match conditions/actions are supported by the accelerator or when there is spare capacity in the accelerator). Otherwise, flow processing remains executed in software on central processing units (CPUs). Such transparent and flexible offloading provides great benefits for VNF developers since VNFs do not need to be re-written, with or without a hardware accelerator, or for different hardware accelerators.

While transparent VNF offloads hide the nitty-gritty details of hardware offloading from VNFs, that does not mean that VNFs are completely free from management responsibility for underlying hardware acceleration. Given that any hardware accelerator comes with finite flow-table capacity, it is still the job of VNFs or whichever entity deploys VNFs to properly manage finite accelerator capacity. For example, in an environment where a massive number of low-rate network flows are arriving, if VNFs blindly offload flows to an embedded NIC switch, saturating its flow table, the NIC will not be able to process any other flows even when it is operating well under line rate. It is known that saturating a NIC's flow table close to its maximum capacity or frequently shuffling offloaded flows in a NIC's embedded switch can significantly degrade NIC's packet processing throughput. See, e.g., Georgios P. Katsikas, Tom Barbette, Marco Chiesa, Dejan Kostic, and Gerald Q. Maguire Jr., "What You Need to Know About (Smart) Network Interface Cards," In Proc. International Conference on Passive and Active Network Measurement 2021, the teachings of which are incorporated herein by reference in their entirety.

SUMMARY

Problems in the prior art advocate for intelligent and selective offloading for VNF flow processing. In other words, there should be intelligent decisions involved in whether to offload given flow processing to an accelerator. Not only that, once a specific flow rule is offloaded, the status of offloaded processing (e.g., number of hits for the offloaded flow rule in hardware) needs to be continuously monitored. When necessary (e.g., when an offloaded flow rule has received very few hits in hardware), offloaded processing needs to be onloaded back to the CPU to make room for other offloadable flow processing.

The existing state-of-the-art solutions that realize this idea all rely on offload decisions driven by end-servers where VNFs are deployed. For example, there can be a separate software agent running on an end-server to monitor an accelerator to fine-tune offloading. Alternatively, VNFs themselves can be designed to make dynamic offload decisions based on self-monitoring. However, such end-server-driven offload-decision approaches suffer from the following problems. First of all, monitoring the status of individual offloaded flow rules (i.e., how many hits each of them receives in hardware) requires periodically querying an accelerator, since offloaded flow processing is completely invisible to CPUs. As the number of offloaded flow rules increases, monitoring every single offloaded rule in an accelerator not only takes up a considerable amount of CPU cycles, but also can interfere with and negatively affect the execution of offloaded rules in hardware. Basing offloading/onloading decisions on outdated accelerator statistics can affect the optimality of the decisions, especially when traffic patterns change dynamically over time. Besides, any untimely offload decisions can introduce a high degree of churns between an accelerator and a CPU (e.g., specific rule processing offloaded and onloaded back and forth frequently), leading to packet losses.

Problems in the prior art are addressed in accordance with the principles of the present disclosure by migrating the aforementioned decision and monitoring logic for VNF acceleration from end-servers (aka end-hosts) to the network. In certain embodiments, an end-server, where one or more VNFs run with hardware acceleration, is connected to an in-network top-of-the-rack (TOR) switch equipped with a programmable data plane, where the in-network TOR switch is leveraged to assist the end-server's decisions for offloading VNF flow processing to one or more hardware accelerators or onloading flow processing from the accelerators back to CPUs.

In at least one embodiment of the present disclosure, a network comprises (i) at least one software-based processor configured to implement at least one VNF associated with flow processing; (ii) at least one hardware accelerator, wherein the software-based processor is configured to offload at least some of the flow processing to the hardware accelerator; and (iii) a module external to the software-based processor and the hardware accelerator and configured to examine a plurality of flows being processed by the network and determine which one or more flows are more suitable for offloading from the software-based processor to the hardware accelerator than one or more other flows.

In at least one other embodiment of the present disclosure, a method comprises (i) at least one software-based processor implementing at least one VNF associated with flow processing and offloading at least some of the flow processing to at least one hardware accelerator and (ii) a module, external to the software-based processor and the hardware accelerator, examining a plurality of flows and determining which one or more flows are more suitable for offloading from the software-based processor to the hardware accelerator than one or more other flows.

BRIEF DESCRIPTION OF THE DRAWINGS

Embodiments of the disclosure will become more fully apparent from the following detailed description, the appended claims, and the accompanying drawings in which like reference numerals identify similar or identical elements.

FIG. 7 is pseudocode for a first top-K elephant-flow-detection algorithm;

FIG. 8 is pseudocode for a second top-K elephant-flow-detection algorithm;

FIG. 9 is pseudocode for the migrate-flow( ) routine in the second top-K elephant-flow-detection algorithm of FIG. 8; and FIG. 10 shows a software flow table that supports mega-flow-rule offloading.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Figure 1:
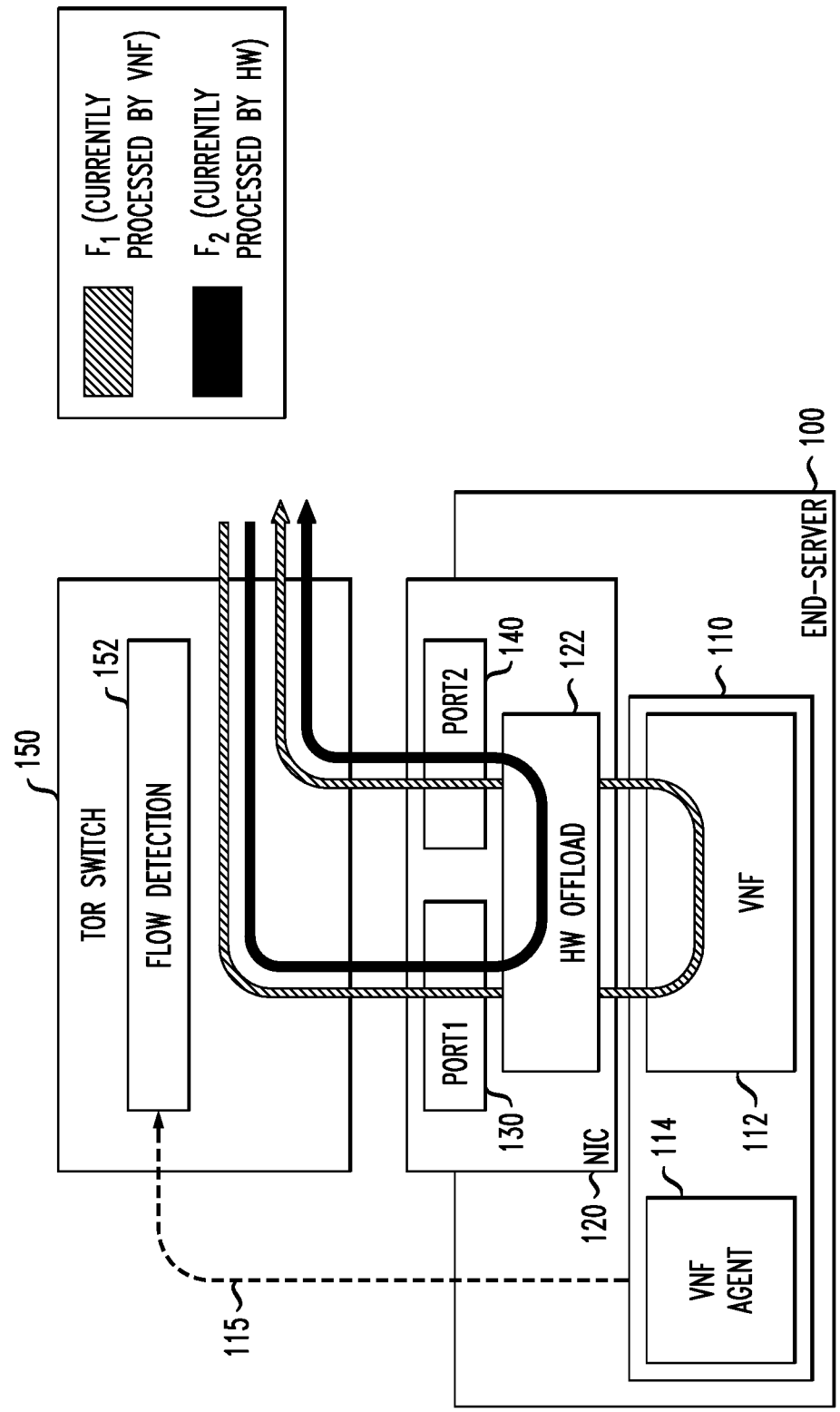
FIG. 1 is a simplified block diagram representing one possible embodiment of the present disclosure.

FIG. 1 is a simplified block diagram representing one possible embodiment of the present disclosure. FIG. 1 shows an end-server 100 having a central processing unit (CPU) 110 and a network interface card (NIC) 120. The CPU 110 executes a VNF 112 and a VNF agent 114 that are implemented in software, while the NIC 120 can perform a hardware (HW) offload 122 of the packet processing performed by the VNF 112 in software. As represented in FIG. 1, packet flows enter the end-server 100 at Port 1 130 and are either (i) onloaded to the CPU 110, in which case, the packets of such an "onloaded" packet flow (e.g., Flow $F_1$) are processed by the VNF 112, or (ii) offloaded to the NIC 120, in which case, the packets of such an "offloaded" packet flow (e.g., Flow F 2) are processed by the HW offload 122. After being processed by the VNF 112, the resulting processed packets of an onloaded packet flow are output from the end-server 100 at Port 2 140. Similarly, after being processed by the HW offload 122, the resulting processed packets of an offloaded packet flow are also output from the end-server 100 at Port 2 140.

As shown in FIG. 1, before reaching the end-server 100, the incoming packet flows flow through an in-network, programmable TOR switch 150 that implements a top-K elephant-flow-detection algorithm 152 that inserts packet tag values into certain packets as described further below. In some implementations, the packet tag values are part of a packet header or appended to the end of a packet. In this context, the term "in-network" means "outside of an end-server". Thus, in FIG. 1, TOR switch 150 is "in-network" because it is outside of end-server 100.

The flow-detection algorithm 152 implements a suitable technique for detecting K (technically, up to K) of the largest packet flows, where the size of a packet flow is a function of the rate of packets in the packet flow, and K is a programmable integer value representing the maximum number of flows that can be offloaded to the HW offload 122. The flow-detection algorithm 152 inserts a suitable tag into a packet when the algorithm detects the following occurrences:

A previously existing packet flow transitions from being a non-elephant flow to being an elephant flow; or A previously existing packet flow transitions from being an elephant flow to being a non-elephant flow.

The flow-detection algorithm 152 monitors the incoming packet flows to identify K elephant flows and sets the packet tags as needed to indicate whether the corresponding flow is an elephant flow to be offloaded to the HW offload 122 or a non-elephant flow to be onloaded to the VNF 112. Over time, as the packet rates of existing packet flows vary, as existing packet flows become inactive, and/or as new packet flows become active, the flow-detection algorithm 152 updates its list of the K largest packet flows and sets packet tag values as needed.

In general, a packet tag carries information about multiple flows (F1, F2, . . . Fn), and whether each of these flows is individually newly added to or removed from the top-K set. Note that a packet tag might or might not refer to the packet flow corresponding to the packet that contains the packet tag. In some implementations, each packet flow is indicated using a five-tuple containing the source and destination IP addresses, the source and destination ports, and the flow protocol. Note that, in addition to the five-tuple, each packet tag has an operation that indicates whether the identified flow is an elephant flow to be offloaded or a non-elephant flow to be onloaded.

Every new flow starts as an onloaded flow handled by the CPU 110 on the end-server. The CPU 110 (either the VNF 112 or the VNF agent 114, depending on the implementation) inspects each received packet to determine whether it has a packet tag and, if so, processes the packet tag to determine whether one or more packet flows need to be individually onloaded or offloaded. If the packet tag indicates that a particular packet flow is an elephant flow, then that packet flow is offloaded for processing by the HW offload 122. On the other hand, if the packet tag indicates that a particular packet flow is a non-elephant flow, then that packet flow is onloaded for processing by the VNF 112. The CPU 110 can inspect only currently onloaded flow packets for tags. Usually, there will always be such packets to carry tags from the TOR switch 150 to the end-server 100, such as packets belonging to new flows or existing non-elephant flows. If such packets are not available at certain times, then the TOR switch 150 can send tags to the end server 100 using out-of-band packets or special in-band packets that do not belong to any traffic flows of the end server 100.

The VNF agent 114 periodically monitors the performance of the NIC 120 to determine whether or not its flow table is full and/or whether or not the NIC 120 has reached its maximum processing bandwidth. If the VNF agent 114 determines that the NIC 120 can handle more offloaded packet flows, then the VNF agent 114 can send a message 115 to instruct the flow-detection algorithm 152 to increase the value of K by one or more, thereby increasing the maximum number of packet flows that can be offloaded to the NIC 120. On the other hand, if the VNF agent 114 determines that the NIC 120 is saturated, then the VNF agent 114 can send a message 115 to instruct the flow-detection algorithm 152 to decrease the value of K by one or more, thereby reducing the maximum number of packet flows that can be offloaded to the NIC 120. In some implementations, the message 115 is a special type of in-band packet that can be processed by the TOR switch 150 on its data plane, such that there is no need for any special "out-of-band" communication between the end-server 100 and the TOR switch 150. In other implementations, the message 115 may be transmitted using "out-of-band" communication and processed by the TOR switch's control plane.

Figure 2:
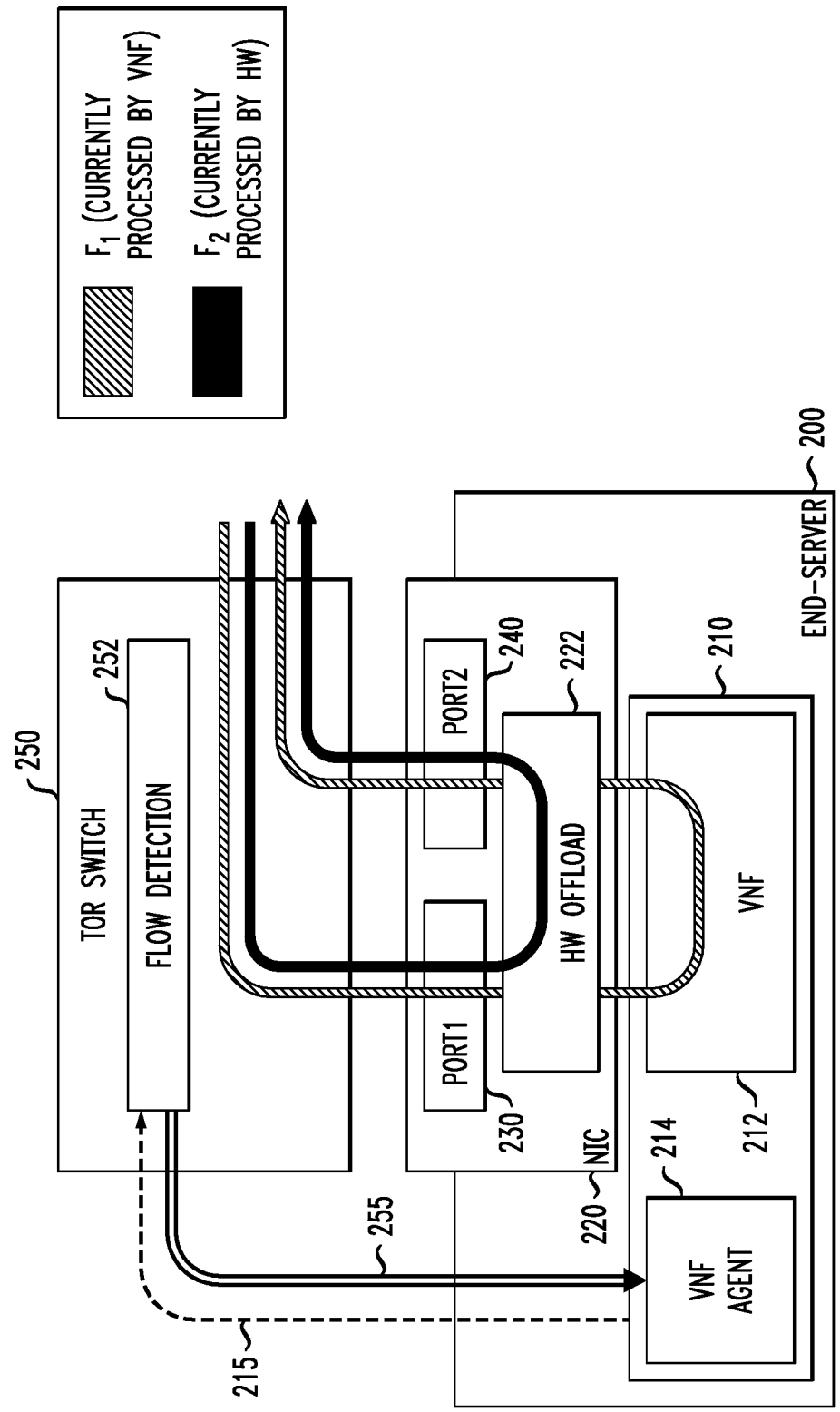
FIG. 2 is a simplified block diagram representing another possible embodiment of the present disclosure.

FIG. 2 is a simplified block diagram representing another possible embodiment of the present disclosure. The embodiment of FIG. 2 is analogous to the embodiment of FIG. 1 with analogous elements 200-252 having similar labels as elements 100-152 of FIG. 1, including elements 230 and 240 of FIG. 2 being respectively analogous to elements 130 and 140 of FIG. 1. In the embodiment of FIG. 2, the flow-detection algorithm 252 does not set packet tag values in the packet headers. Instead, the flow-detection algorithm 252 sends out-of-band messages 255 to the VNF agent 214 delivered over the control plane interface of the TOR switch 250 to identify the K packet flows that should be offloaded to the HW offload 222. The VNF agent 214 then updates the flow table in the NIC 220 as needed to cause the NIC 220 to offload those particular packet flows for processing by the HW offload 222 and onload the remaining packet flows for processing by the VNF 212. All other processing in the embodiment of FIG. 2 is the same as the corresponding processing in the embodiment of FIG. 1.

Although the embodiments shown in FIGS. 1 and 2 have a single, in-network, programmable TOR switch 150/250 connected to a single end-server 100/200 having (i) a single NIC 120/220 having a single HW offload 122/222 and (ii) a single CPU 110/210 implementing a single VNF 112/212, the present disclosure is not limited to that architecture. In general, a system may have one or more in-network, programmable switches (which might or might not all be TOR switches), each in-network switch connected to one or more end-servers, each end-server having one or more NICs and one or more CPUs, each NIC having one or more HW offloads and each CPU implementing one or more VNFs. In the general environment, for each NIC of an end-server, one in-network, programmable switch which can see all network flows entering the NIC is designated to perform flow offloading/onloading and monitoring tasks for the NIC.

In certain embodiments of the disclosure, including the embodiments shown in FIGS. 1 and 2, the in-network, programmable switch performs two tasks: (i) monitoring network flows sent to the one or more end-servers connected to the switch and (ii) making offload/onload decisions for monitored flows on behalf of the end-server(s). The outcomes of the decisions (e.g., whether to offload a particular flow to a NIC HW offload or whether to onload that flow to a CPU VNF) are communicated to the end-server(s) via either packet tagging (as in FIG. 1) or out-of-band messages (as in FIG. 2). The in-network decisions sent by the switch are processed either by the VNF itself (as in FIG. 1) or by the VNF agent (as in FIG. 2) to perform offloading/onloading for individual network flows accordingly. In either case, the VNF agent sends feedback to the switch (e.g., the value K) to help it fine-tune its decisions, as well as let the switch know how many VNFs are running in a chain on each CPU. In general, if a CPU implements a VNF chain of length N with the NIC having up to N corresponding HW offloads, then a single flow can result in up to N flow rules to offload.

Certain embodiments of the disclosure provide one or more of the following benefits:

Savings in end-server CPUs: Since the requirement for offload decision-making and accelerator monitoring is moved from end-servers to network elements (e.g., TOR switches), significant savings in end-server CPUs for hardware acceleration management can be realized.

No interference in hardware accelerators: Since there is no need for accelerator monitoring, accelerators will not be interrupted by frequent and expensive hardware queries, and this will eliminate performance interference in the accelerators.

More responsiveness to temporal dynamics in traffic: In-network offloading/onloading decisions that do not rely on periodically querying accelerators can lead to much faster response to changing traffic patterns when adjusting offloading to temporal traffic changes.

Background on VNF Deployment

In data centers, it is common that one or more VNFs are chained and deployed as a group to realize a multi-stage, packet-processing pipeline, where each VNF in the chain implements a specific type of packet processing (e.g., classification, access control, forwarding, etc.) and is independently programmed via its own match/action table.

Figure 3:
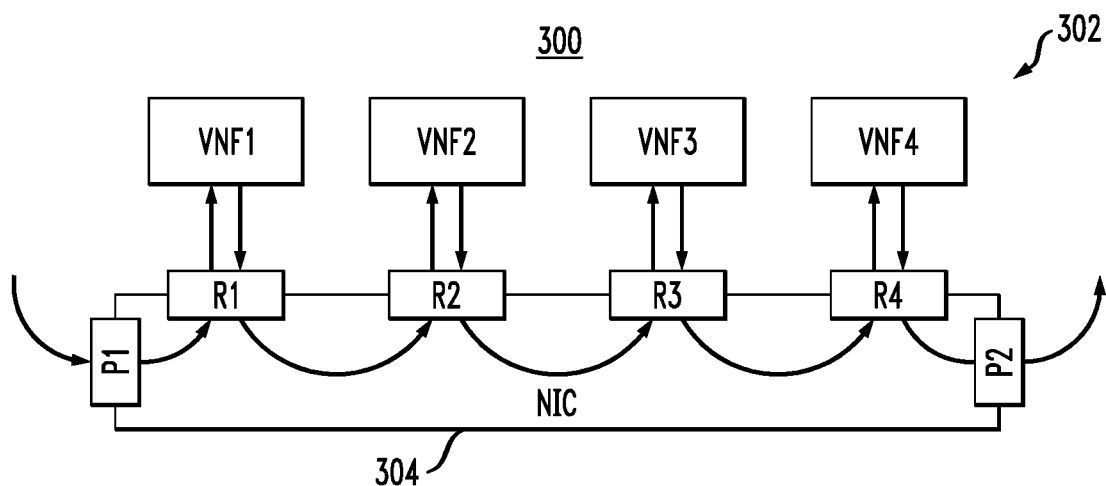
FIG. 3 shows a chain of four VNFs deployed on an end-server.

FIG. 3 shows a chain 302 of four VNFs (VNF1→VNF2→VNF3→VNF4) deployed on an end-server 300. Traffic enters the end-server via NIC port P1, is processed by the chain 302, and leaves the end-server 300 via NIC port P2. Each VNF receives and transmits packets via its own designated NIC port (R1-R4), realized, e.g., with single-root input/output virtualization (SR-IOV). In this deployment, there is no hardware acceleration for VNF packet processing, and all four VNFs perform packet processing in software. Each VNF stage can independently scale up by deploying additional VNF instances.

Figure 4:
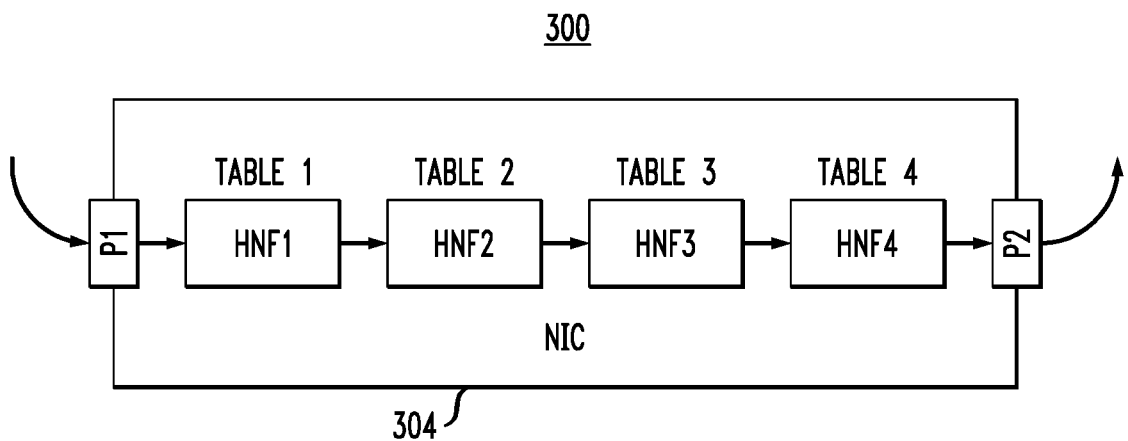
FIG. 4 shows the case where the same VNF chain of FIG. 3 is fully offloaded to NIC hardware.

FIG. 4 shows the case where the same VNF chain 302 of FIG. 3 is fully offloaded to NIC hardware 304. Here, it is assumed that each VNF's packet-processing logic can be expressed as hardware-offloadable match/action rules stored in a hardware flow table (not shown in FIG. 4). Hardware-offloaded VNFi is represented as HNFi in the figure. The hardware network function (HNF) chain 304 is realized by jumping through flow tables created for different HNFs. While the full hardware offload can save end-server CPUs required for software packet processing, its main drawback is that it cannot support dynamic scaling of HNFs. If there is any HNF in the chain 304 that cannot keep up with traffic demand, the entire HNF chain will suffer from degraded performance.

Figure 5:
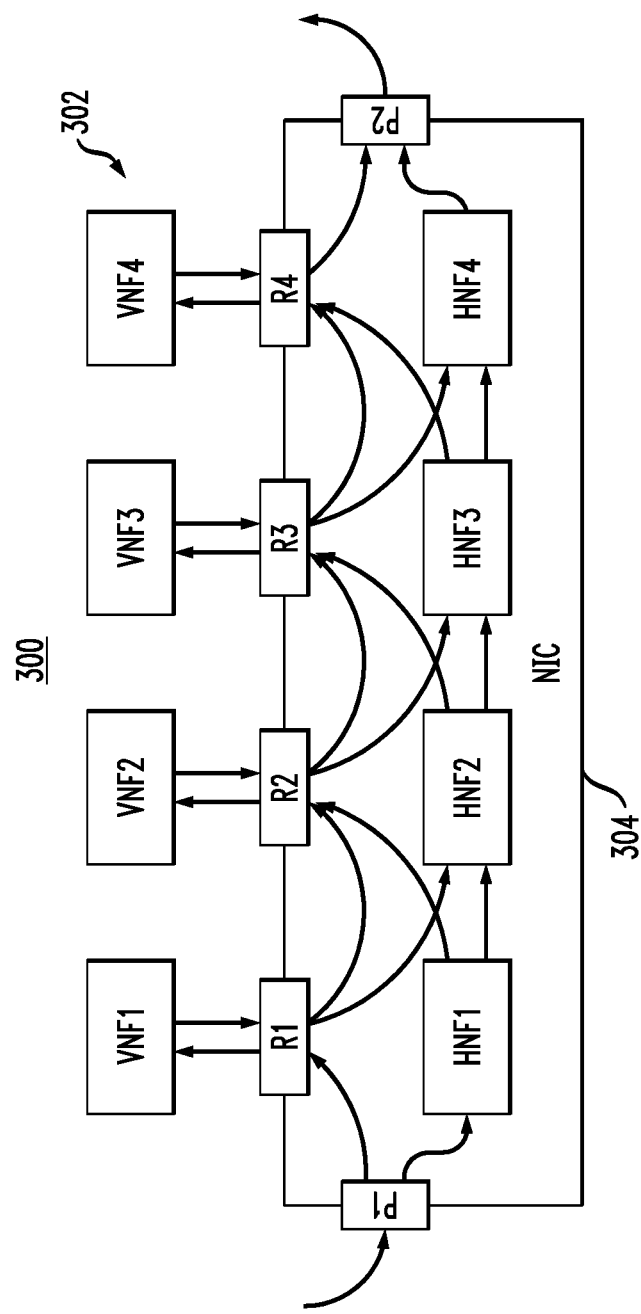
FIG. 5 shows a hybrid deployment of the VNF chain of FIG. 3, where packet processing for some flows is allowed to run in software, with packet processing for other flows being offloaded to hardware at the same time.

FIG. 5 shows a hybrid deployment of the VNF chain 304 of FIG. 3, where packet processing for some flows is allowed to run in software, with packet processing for other flows being offloaded to hardware at the same time. In the most flexible deployment, each VNF allows incoming network flows to be dynamically steered to either software or hardware on a per-flow basis, based on its own offloading decision for each flow.

Figure 6:
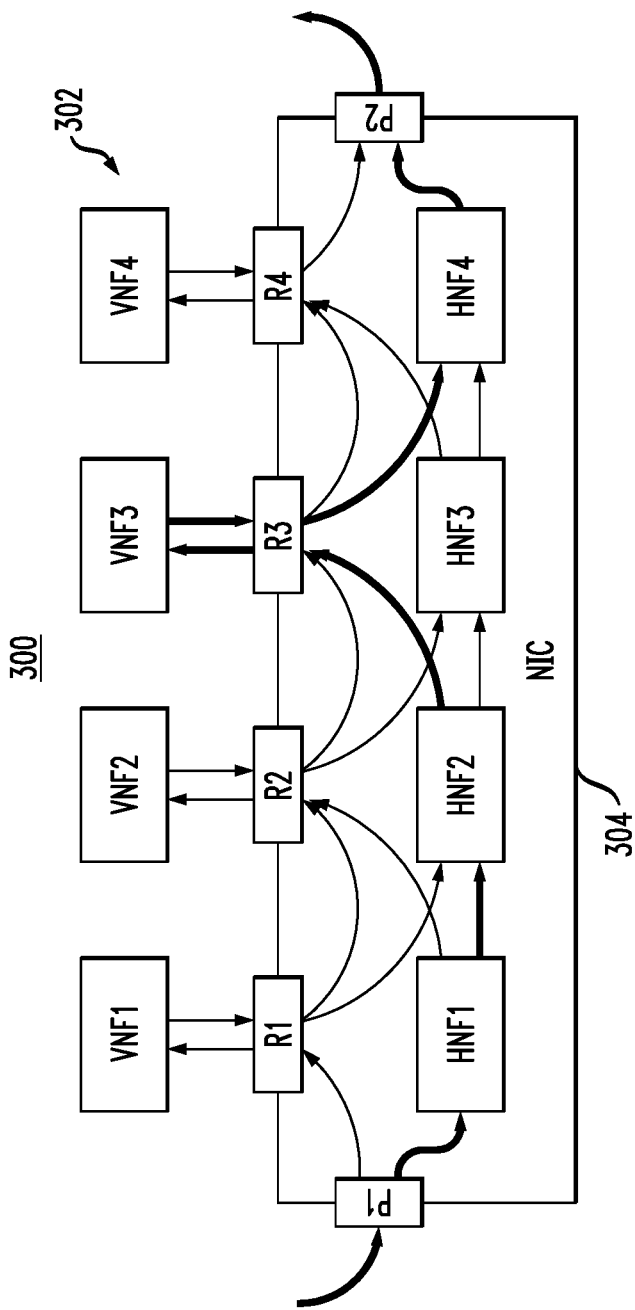
FIG. 6 illustrates one example of the dynamic steering of FIG. 5, where a network flow (highlighted using a darker line) goes through a hardware-accelerated VNF chain, except for VNF3 which runs in software.

FIG. 6 illustrates one example of the dynamic steering of FIG. 5, where a network flow (highlighted using a darker line) goes through a hardware-accelerated VNF chain, except for VNF3 which runs in software. The present disclosure proposes the architecture of FIGS. 1 and 2 for this most-flexible VNF deployment environment, where VNF packet processing can be dynamically offloaded or onloaded.

Programmable TOR Switch

In certain embodiments of this disclosure, each end-server (e.g., 100/200 of FIGS. 1 and 2), where VNFs run with hardware acceleration, is connected to its designated programmable TOR switch (e.g., 150/250 of FIGS. 1 and 2). Besides running as a traditional leaf switch for a rack, the additional role of a programmable TOR switch is to make hardware offloading/onloading decisions for VNFs running on each end-server in the rack. For this purpose, the TOR switch operates a decision engine (e.g., 152/252 of FIGS. 1 and 2) implemented within the switch's data plane by leveraging its programmability and stateful memory. The decision engine monitors network flows sent to each end-server connected to the switch and makes offloading/onloading decisions for corresponding flow rules based on flow characteristics. The decision engine delivers the outcome of its decisions to the end-servers either in the form of special packet tags attached to the flows in band (as in FIG. 1) or via out-of-band messages sent to the end-servers (as in FIG. 2), depending on VNF implementations.

Each end-server runs a software daemon called the VNF agent (e.g., 114/214 of FIGS. 1 and 2) which communicates with the TOR switch bidirectionally. In the downstream direction, the VNF agent receives from the TOR switch its offloading/onloading decisions about individual flows (e.g., 255 of FIG. 2), in case packet tagging is not leveraged. In the upstream direction, the VNF agent sends to the TOR switch the information about what type of VNFs are running on the local end-server, and also provides feedback on the switch's offload decisions (e.g., 115/215 of FIGS. 1 and 2). The communication between the VNF agent and the TOR switch can be implemented either via the switch's control plane or directly over its data plane. In the former case, the switch's control plane protocol supports the communication. In the latter case, data plane programmability can be leveraged to implement the communication without any additional support from the switch.

In-Network Decision Engine for Flow Offloads

Inside a TOR switch, it is possible to implement different kinds of decision engines, depending on the type of VNF acceleration available on the end-servers. Since the most-popular VNF acceleration is flow-level packet-processing offload, the following focusses on the flow-offload use case. Another possible use case is based on bin-packing decisions, where the goal is to find the top flows whose aggregate packet rate is less than a specified threshold value.

For flow offload, the decision engine implements an algorithm for finding top-K elephant flows for each end-server connected to the switch. The rationale behind such an algorithm is that, when flow-level packet processing is offloaded to hardware with a finite number of flow-table entries, it is more beneficial to offload long-lived elephant flows than short-lived mice flows. Although the disclosure is not limited to any specific top-K elephant-flow-detection algorithm, a qualified algorithm meets the following two requirements:

R1: Given K, the algorithm continuously updates the top-K set in real time as traffic pattern changes. At any given point in time, the top-K set for a given end-server captures the K largest network flows being sent to the server.

R2: The parameter K for a given end-server can increase or decrease over time based on the feedback received from its VNF agent. In response to changing K, the algorithm incrementally updates the top-K set. For example, when K increases from K1 to K2, the algorithm gradually adds the (K2−K1) next-biggest flows to the existing top-K1 set. When K decreases from K2 to K1, the algorithm incrementally removes the (K2−K1) smallest flows in top-K2 set.

Note that such a top-K elephant-flow-detection algorithm cannot be implemented on end-servers because, once elephant flows are offloaded to hardware, they are invisible to CPUs, and hence cannot be further tracked unless hardware is queried for their statistics.

An algorithm that meets requirements R1 and R2 can be implemented by adapting the HIFLOW algorithm from U.S. Patent Application Publication No. US 2022/0006737 A1, the teaching of which are incorporated herein by reference in their entirety. The adapted HIFLOW algorithm is shown in Algorithm 1 of FIG. 7. One change made to the original HIFLOW algorithm is that an incoming packet is tagged whenever the maintained top-K set is updated by the algorithm. Algorithm 1 finds the top-K elephant flows at any point in time, where K is fixed, and hence meets the requirement R1, but not R2.

Algorithm 2 of FIGS. 8 and 9 extends Algorithm 1 to handle the case where K is increased or decreased at run time (R2). Since the top-K elephant flows are maintained in a hash table of size K, when K changes to K', the hash table needs to be resized to K', which involves expensive rehashing operations for all existing top-K flows. In order to amortize the cost of rehashing over time, Algorithm 2 of FIGS. 8 and 9 performs incremental rehashing, where only a small subset of flows in the top-K set are migrated to the top-K' set each time (denoted with $M_{const}$ parameter in Algorithm 3). $M_{const}$ determines how quickly hash resizing will be completed, and can be adjusted based on deployment requirements.

Both Algorithms 1 and 2 assume that packet tags are used to communicate offload decisions to the end-server as in FIG. 1. If out-of-band communication is used instead, the packet tag operation in the algorithms needs to be replaced by out-of-band message communication, as in messages 255 of FIG. 2.

Network-Assisted Flow Offloads

As described in Algorithms 1 and 2, whenever the top-K set is updated due to temporal change in traffic patterns, an incoming packet is tagged. Each such packet tag carries information indicating whether or not the corresponding flow is a top-K elephant flow. The following describes how a recipient end-server exploits this information.

Single-VNF Deployment with Microflow Rules

Before discussing full-blown general VNF chain deployments, this section describes a simplistic deployment scenario, where a single VNF runs on an end-server with microflow rules (i.e., each rule matching a particular network flow). In this case, the TOR switch performs top-K elephant-flow detection for the end-server, where K is set to the size of the hardware flow table utilized by the VNF's flow offloads.

FIG. 1 illustrates one such scenario, where Flow $F_1$ is a mouse flow (i.e., not a top-K elephant flow) processed by the software VNF 112 and Flow $F_2$ is a top-K elephant flow processed by the HW offload 122. If, over time, the TOR switch 150 determines that Flow $F_1$ is now a top-K elephant flow and Flow $F_2$ is now a mouse flow, then the TOR switch 150 will ensure that a packet tag in a packet an onloaded packet flow indicates that Flow $F_1$ is to be processed by the HW offload 122 and Flow $F_2$ is to be processed by the VNF 112. Following the semantic of the tag, the VNF 112 or the VNF agent 114 (depending on the implementation) offloads the rule for Flow $F_1$ to hardware and removes the rule for Flow $F_2$ from hardware. In this case, K does not need to be changed over time since the hardware flow table size is fixed and the table is populated with microflow rules. As such, the end-server 100 does not need to monitor the usage of the hardware flow table since the flow table is automatically populated based on the up-to-date top-K set maintained by the switch.

Single-VNF Deployment with Megaflow Rules

In practice, VNFs can be programmed with megaflow rules that involve various wildcard matching such as longest IP prefix matching. A microflow rule is a rule that is applied to a specific network flow (e.g., with a fixed set of five-tuples). A megaflow rule, which is often called a wildcard rule, refers to a rule that is applied to a group of network flows (e.g., via IP prefix matching). In this case, a given (offloaded or onloaded) flow rule can match one or more network flows. To support megaflow-rule offloading, the software flow table entries maintained by the VNFs are extended as shown in FIG. 10. That is, in addition to match/action tuples, the table maintains two additional columns that indicate elephant flow count ($C_E$) and offload status. Whenever a packet p arrives with a tag indicating membership change in the top-K flow set, the VNF updates $C_E$ for matched rows in the table (i.e., either increment $C_E$ for the row that matches F in case flow F is added, or decrement $C_E$ for the row that matches F in case flow F is removed). The VNF offloads match/action rules with $C_E > C_{OFF}$, and performs onloading for offloaded rules with $C_E \leq C_{ON}$. A baseline deployment can have $C_{OFF} = C_{ON} = 0$. Depending on traffic conditions, it is also possible to have $C_{OFF} > C_{ON} \geq 0$ to avoid frequent back-and-forth offloading and onloading for a given rule.

In VNF deployments with megaflow rules, the parameter K in the top-K elephant-flow detection can increase or decrease over time. The top-K elephant-flow-detection algorithm starts with a default K. If the number of offloaded flow rules is very small with a given K, due to wildcard matching, the VNF agent can ask the TOR switch to increase K to allow more rules to be offloaded to hardware. Conversely, if the utilization of the hardware flow table increases to the point where it affects VNF performance negatively, then the VNF agent can instruct the TOR switch to decrease K.

In some VNFs, minimum megaflow granularity of wildcard flow rules may be pre-defined. For example, the IP address prefix length for all wildcard-matching rules is L or higher. In that case, information about megaflow granularity (e.g., maximum prefix length L) can be communicated by the VNF agent to the TOR switch, which will perform top-K elephant-flow detection at the megaflow level (i.e., top-K megaflows with prefix length L), not at the microflow level. This will reduce the memory requirement of the switch since multiple network flows can be aggregated into one. The overall scheme for supporting megaflow offload is shown in FIG. 10.

Multi-VNF Deployment with Megaflow Rules

In real VNF deployments, it is possible that multiple VNFs are chained together and deployed on an end-server, in which case, these VNFs share the same flow-offloading hardware engine on the server. In this multi-VNF deployment scenario, each end-server runs one type of VNF chain, not multiple VNF chains of different types. Under this assumption, multi-VNF deployment can be handled by extending the single-VNF deployment described previously as follows.

First of all, when a packet with tag $<f_c>$ enters a chain of VNFs, the first VNF and each intermediate VNF in the chain does not discard the tag in the packet after processing it, but preserves the tag for the next-stage VNF. The last VNF in the chain untags the packet before transmitting it out of the server. That way, every VNF in the chain can update the $C_E$'s in its own flow table based on the same tag as described previously for megaflow offloading. After updating the $C_E$'s in its flow table, each VNF makes independent offload decisions for its flow rules. When providing feedback on K to the TOR switch, the VNF agent considers the aggregate number of offloaded flows across all flow tables maintained by the different VNFs in the chain.

In certain embodiments of the present disclosure, a network comprises (i) at least one software-based processor (e.g., 110, 210) configured to implement at least one VNF (e.g., 112, 212) associated with flow processing; (ii) at least one hardware accelerator (e.g., 122, 222), wherein the software-based processor is configured to offload at least some of the flow processing to the hardware accelerator; and (iii) a module (e.g., 150, 250) external to the software-based processor and the hardware accelerator and configured to examine a plurality of flows being processed by the network and determine which one or more flows are more suitable for offloading from the software-based processor to the hardware accelerator than one or more other flows.

In at least some of the above embodiments, the external module is configured to communicate, to the software-based processor, the relative suitability for offloading of a flow; and the software-based processor is configured to use the relative suitability for offloading to determine whether or not to offload the flow.

In at least some of the above embodiments, the external module is configured to determine that larger flows are more suitable for offloading than smaller flows.

In at least some of the above embodiments, the external module is configured to perform an elephant-flow-detection algorithm to identify the larger flows.

In at least some of the above embodiments, the external module is configured to insert a tag into a packet identifying the determined suitability for offloading of one or more flows.

In at least some of the above embodiments, the external module is configured to transmit an out-of-band message (e.g., 255) to the software-based processor conveying the determined suitability for offloading of one or more flows.

In at least some of the above embodiments, the software-based processor is configured to implement a VNF agent (e.g., 214) that processes the out-of-band message.

In at least some of the above embodiments, the external module is configured to identify a specified number of flows for offloading.

In at least some of the above embodiments, the specified number is programmable.

In at least some of the above embodiments, the software-based processor is configured to transmit a message (e.g., 115, 215) to the external module to change the programmable specified number.

In at least some of the above embodiments, the message is an out-of-band message handled by the external module's control plane.

In at least some of the above embodiments, the message is an in-band message handled by the external module's data plane.

In at least some of the above embodiments, the software-based processor is a CPU of an end-server in the network; the hardware accelerator is part of a NIC of the end-server; and the external module is part of a TOR switch in the network.

In certain embodiments of the present disclosure, a method comprises (i) at least one software-based processor (e.g., 110, 210) implementing at least one VNF (e.g., 112, 212) associated with flow processing and offloading at least some of the flow processing to at least one hardware accelerator (e.g., 122, 222) and (ii) a module (e.g., 150, 250), external to the software-based processor and the hardware accelerator, examining a plurality of flows and determining which one or more flows are more suitable for offloading from the software-based processor to the hardware accelerator than one or more other flows.

In at least some of the above embodiments, the external module communicates, to the software-based processor, the relative suitability for offloading of a flow; and the software-based processor uses the relative suitability for offloading to determine whether or not to offload the flow.

In at least some of the above embodiments, the external module determines that larger flows are more suitable for offloading than smaller flows.

In at least some of the above embodiments, the external module inserts a tag into a packet identifying the determined suitability for offloading of one or more flows.

In at least some of the above embodiments, the external module transmits an out-of-band message (e.g., 255) to the software-based processor conveying the determined suitability for offloading of one or more flows.

In at least some of the above embodiments, the external module is configured to identify a specified number of flows for offloading; the specified number is programmable; and the software-based processor transmits a message (e.g., 115, 215) to the external module to change the programmable specified number.

In at least some of the above embodiments, the software-based processor is a CPU of an end-server in the network; the hardware accelerator is part of a NIC of the end-server; and the external module is part of a TOR switch in the network.

Unless explicitly stated otherwise, each numerical value and range should be interpreted as being approximate as if the word "about" or "approximately" preceded the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence. Likewise, additional steps may be included in such methods, and certain steps may be omitted or combined, in methods consistent with various embodiments of the disclosure.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

As used herein in reference to an element and a standard, the terms "compatible" and "conform" mean that the element communicates with other elements in a manner wholly or partially specified by the standard, and would be recognized by other elements as sufficiently capable of communicating with the other elements in the manner specified by the standard. A compatible or conforming element does not need to operate internally in a manner specified by the standard.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

As will be appreciated by one of ordinary skill in the art, the present disclosure may be embodied as an apparatus (including, for example, a system, a network, a machine, a device, a computer program product, and/or the like), as a method (including, for example, a business process, a computer-implemented process, and/or the like), or as any combination of the foregoing. Accordingly, embodiments of the present disclosure may take the form of an entirely software-based embodiment (including firmware, resident software, micro-code, and the like), an entirely hardware embodiment, or an embodiment combining software and hardware aspects that may generally be referred to herein as a "system" or "network".

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the disclosure. When implemented on a general-purpose processor, the program code segments combine with the processor to provide a unique device that operates analogously to specific logic circuits.

The term "non-transitory," as used herein, is a limitation of the medium itself (i.e., tangible, not a signal) as opposed to a limitation on data storage persistency (e.g., RAM vs. ROM).

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements. For example, the phrases "at least one of A and B" and "at least one of A or B" are both to be interpreted to have the same meaning, encompassing the following three possibilities: 1—only A; 2—only B; 3—both A and B.

All documents mentioned herein are hereby incorporated by reference in their entirety or alternatively to provide the disclosure for which they were specifically relied upon.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

While preferred embodiments of the disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the technology of the disclosure. It is intended that the following claims define the scope of the invention and that methods and structures within the scope of these claims and their equivalents be covered thereby.

What is claimed is:

1. A network comprising:
    at least one software-based processor configured to implement at least one virtual network function (VNF) associated with flow processing;
    at least one hardware accelerator, wherein the software-based processor is configured to offload at least some of the flow processing to the hardware accelerator; and
    a module external to the software-based processor and the hardware accelerator and configured to examine a plurality of flows being processed by the network and determine which one or more flows are more suitable for offloading from the software-based processor to the hardware accelerator than one or more other flows, wherein:
        the at least one software-based processor and the at least one hardware accelerator are part of an end-server in the network; and
        the module is part of a network switch in the network that is external to the end-server and interconnects the end-server to one or more other end-servers in the network.

2. The network of claim 1, wherein:
    the external module is configured to communicate, to the software-based processor, the relative suitability for offloading of a flow; and
    the software-based processor is configured to use the relative suitability for offloading to determine whether or not to offload the flow.

3. The network of claim 1, wherein the external module is configured to determine that larger flows are more suitable for offloading than smaller flows.

4. The network of claim 3, wherein the external module is configured to perform an elephant-flow-detection algorithm to identify the larger flows.

5. The network of claim 1, wherein the external module is configured to insert a tag into a packet identifying the determined suitability for offloading of one or more flows.

6. The network of claim 1, wherein the external module is configured to transmit an out-of-band message to the software-based processor conveying the determined suitability for offloading of one or more flows.

7. The network of claim 6, wherein the software-based processor is configured to implement a VNF agent that processes the out-of-band message.

8. The network of claim 1, wherein the external module is configured to identify a specified number of flows for offloading.

9. The network of claim 8, wherein the specified number is programmable.

10. The network of claim 9, wherein the software-based processor is configured to transmit a message to the external module to change the programmable specified number.

11. The network of claim 10, wherein the message is an out-of-band message handled by the external module's control plane.

12. The network of claim 10, wherein the message is an in-band message handled by the external module's data plane.

13. The network of claim 1, wherein:
the software-based processor is a central processing unit (CPU) of the end-server in the network;
the hardware accelerator is part of a network interface card (NIC) of the end-server; and
the external module is part of a top-of-the-rack (TOR) switch in the network.

14. The network of claim 1, wherein:
the external module is configured to communicate, to the software-based processor, the relative suitability for offloading of a flow;
the software-based processor is configured to use the relative suitability for offloading to determine whether or not to offload the flow;
the external module is configured to determine that larger flows are more suitable for offloading than smaller flows;
the external module is configured to insert a tag into a packet identifying the determined suitability for offloading of one or more flows;
the external module is configured to identify a specified number of flows for offloading;
the software-based processor is a central processing unit (CPU) of the end-server in the network;
the hardware accelerator is part of a network interface card (NIC) of the end-server; and
the external module is part of a top-of-the-rack (TOR) switch in the network.

15. A method comprising:
at least one software-based processor implementing at least one virtual network function (VNF) associated with flow processing and offloading at least some of the flow processing to at least one hardware accelerator; and
a module, external to the software-based processor and the hardware accelerator, examining a plurality of flows and determining which one or more flows are more suitable for offloading from the software-based processor to the hardware accelerator than one or more other flows, wherein:
the at least one software-based processor and the at least one hardware accelerator are part of an end-server in the network; and
the module is part of a network switch in the network that is external to the end-server and interconnects the end-server to one or more other end-servers in the network.

16. The method of claim 15, wherein:
the external module communicates, to the software-based processor, the relative suitability for offloading of a flow; and
the software-based processor uses the relative suitability for offloading to determine whether or not to offload the flow.

17. The method of claim 15, wherein the external module determines that larger flows are more suitable for offloading than smaller flows.

18. The method of claim 15, wherein the external module inserts a tag into a packet identifying the determined suitability for offloading of one or more flows.

19. The method of claim 15, wherein the external module transmits an out-of-band message to the software-based processor conveying the determined suitability for offloading of one or more flows.

20. The method of claim 15, wherein:
the external module is configured to identify a specified number of flows for offloading;
the specified number is programmable; and
the software-based processor transmits a message to the external module to change the programmable specified number.

21. The method of claim 15, wherein:
the software-based processor is a central processing unit (CPU) of the end-server in the network;
the hardware accelerator is part of a network interface card (NIC) of the end-server; and
the external module is part of a top-of-the-rack (TOR) switch in the network.

22. The method of claim 15, wherein:
the external module communicates, to the software-based processor, the relative suitability for offloading of a flow;
the software-based processor uses the relative suitability for offloading to determine whether or not to offload the flow;
the external module determines that larger flows are more suitable for offloading than smaller flows;
the external module inserts a tag into a packet identifying the determined suitability for offloading of one or more flows;
the external module is configured to identify a specified number of flows for offloading;
the specified number is programmable;
the software-based processor transmits a message to the external module to change the programmable specified number;
the software-based processor is a central processing unit (CPU) of the end-server in the network;
the hardware accelerator is part of a network interface card (NIC) of the end-server; and
the external module is part of a top-of-the-rack (TOR) switch in the network.

23. A network comprising:
at least one software-based processor configured to implement at least one virtual network function (VNF) associated with flow processing;
at least one hardware accelerator, wherein the software-based processor is configured to offload at least some of the flow processing to the hardware accelerator; and a module external to the software-based processor and the hardware accelerator and configured to examine a plurality of flows being processed by the network and determine which one or more flows are more suitable for offloading from the software-based processor to the hardware accelerator than one or more other flows, wherein:
the external module is configured to communicate, to the software-based processor, the relative suitability for offloading of a flow; and
the software-based processor is configured to use the relative suitability for offloading to determine whether or not to offload the flow.

24. A network comprising:
at least one software-based processor configured to implement at least one virtual network function (VNF) associated with flow processing;
at least one hardware accelerator, wherein the software-based processor is configured to offload at least some of the flow processing to the hardware accelerator; and
a module external to the software-based processor and the hardware accelerator and configured to examine a plurality of flows being processed by the network and determine which one or more flows are more suitable for offloading from the software-based processor to the hardware accelerator than one or more other flows, wherein the external module is configured to transmit an out-of-band message to the software-based processor conveying the determined suitability for offloading of one or more flows.

25. The network of claim 24, wherein the software-based processor is configured to implement a VNF agent that processes the out-of-band message.

26. A network comprising:
at least one software-based processor configured to implement at least one virtual network function (VNF) associated with flow processing;
at least one hardware accelerator, wherein the software-based processor is configured to offload at least some of the flow processing to the hardware accelerator; and
a module external to the software-based processor and the hardware accelerator and configured to examine a plurality of flows being processed by the network and determine which one or more flows are more suitable for offloading from the software-based processor to the hardware accelerator than one or more other flows, wherein the external module is configured to identify a specified programmable number of flows for offloading.

27. The network of claim 26, wherein the software-based processor is configured to transmit a message to the external module to change the programmable specified number.

28. The network of claim 27, wherein the message is an out-of-band message handled by the external module's control plane.

29. The network of claim 27, wherein the message is an in-band message handled by the external module's data plane.

30. A method comprising:
at least one software-based processor implementing at least one virtual network function (VNF) associated with flow processing and offloading at least some of the flow processing to at least one hardware accelerator; and
a module, external to the software-based processor and the hardware accelerator, examining a plurality of flows and determining which one or more flows are more suitable for offloading from the software-based processor to the hardware accelerator than one or more other flows, wherein:
the external module communicates, to the software-based processor, the relative suitability for offloading of a flow; and
the software-based processor uses the relative suitability for offloading to determine whether or not to offload the flow.

31. A method comprising:
at least one software-based processor implementing at least one virtual network function (VNF) associated with flow processing and offloading at least some of the flow processing to at least one hardware accelerator; and
a module, external to the software-based processor and the hardware accelerator, examining a plurality of flows and determining which one or more flows are more suitable for offloading from the software-based processor to the hardware accelerator than one or more other flows, wherein the external module transmits an out-of-band message to the software-based processor conveying the determined suitability for offloading of one or more flows.

32. A method comprising:
at least one software-based processor implementing at least one virtual network function (VNF) associated with flow processing and offloading at least some of the flow processing to at least one hardware accelerator; and
a module, external to the software-based processor and the hardware accelerator, examining a plurality of flows and determining which one or more flows are more suitable for offloading from the software-based processor to the hardware accelerator than one or more other flows, wherein:
the external module is configured to identify a specified number of flows for offloading;
the specified number is programmable; and
the software-based processor transmits a message to the external module to change the programmable specified number.

* * * * *